United States Patent [19]

Ellingson

[11] 4,004,387
[45] Jan. 25, 1977

[54] PANELS AND THE METHOD OF SAME FOR HOUSE CONSTRUCTION

[76] Inventor: Jerome B. Ellingson, R.R. 1, Moorhead, Minn. 56560

[22] Filed: Aug. 20, 1975

[21] Appl. No.: 606,109

[52] U.S. Cl. .............................. 52/309.3; 52/286; 52/406; 52/586; 264/51; 264/58

[51] Int. Cl.² ...................... E04C 1/00; B28B 9/00; B28H 9/02

[58] Field of Search ............ 52/580, 582, 585, 586, 52/309, 283, 286, 406–410, 94, 248; 264/251, 255, 257, 258

[56] References Cited

UNITED STATES PATENTS

| | | | |
|---|---|---|---|
| 2,718,138 | 9/1955 | Jones | 52/410 |
| 2,844,848 | 7/1958 | Couse et al. | 52/586 |
| 2,850,771 | 9/1958 | Wagner | 52/586 |
| 2,858,580 | 11/1958 | Thompson et al. | 52/407 |
| 3,236,014 | 2/1966 | Edgar | 52/286 |
| 3,507,738 | 4/1970 | Prusinski et al. | 52/309 |
| 3,530,628 | 9/1970 | Ferris et al. | 52/248 |
| 3,775,240 | 11/1973 | Harvey et al. | 52/94 |
| 3,803,784 | 4/1974 | Becker | 52/615 |

FOREIGN PATENTS OR APPLICATIONS

| | | | |
|---|---|---|---|
| 597,222 | 1/1948 | United Kingdom | 52/586 |
| 606,691 | 8/1948 | United Kingdom | 52/585 |

Primary Examiner—James L. Ridgill, Jr.
Attorney, Agent, or Firm—Schroeder Siegfried Ryan & Vidas

[57] ABSTRACT

An improved panel and method of making the panel for building construction in which fiberglass layers separated by insulation and having plastic reinforcing spaced intermediate the extent of the same provides the stud structure for the panels and the connecting means for securing the panels to a floor and ceiling with keyway members positioned in the panels to permit the use of key members for the interconnection of the panels in the building construction.

15 Claims, 16 Drawing Figures

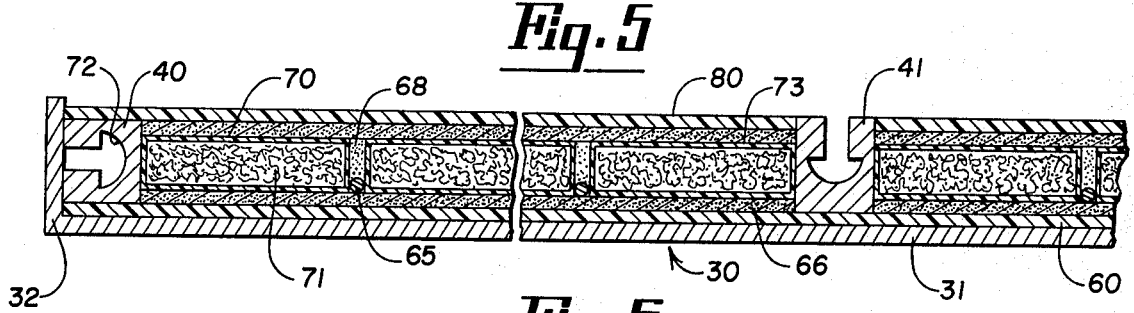
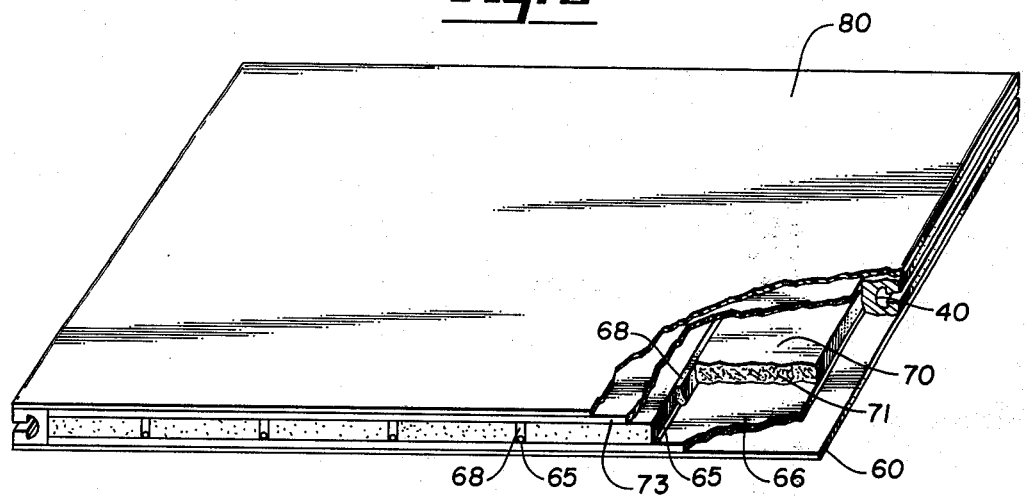
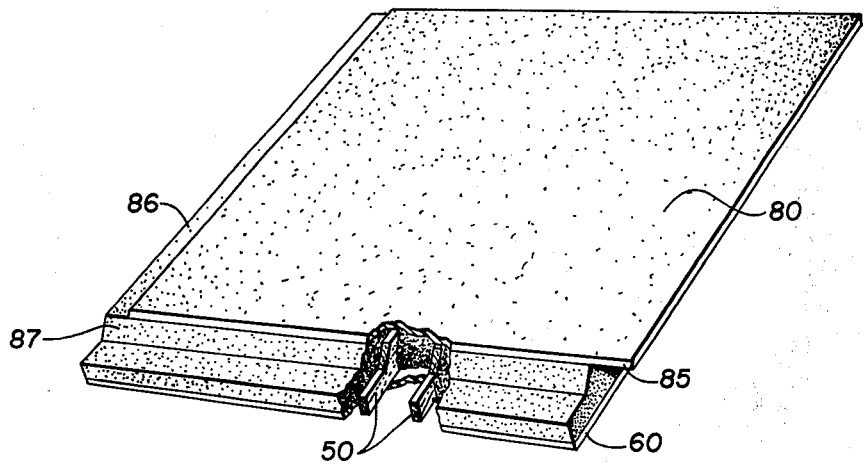
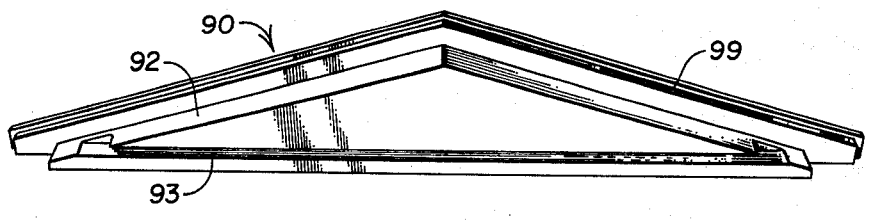

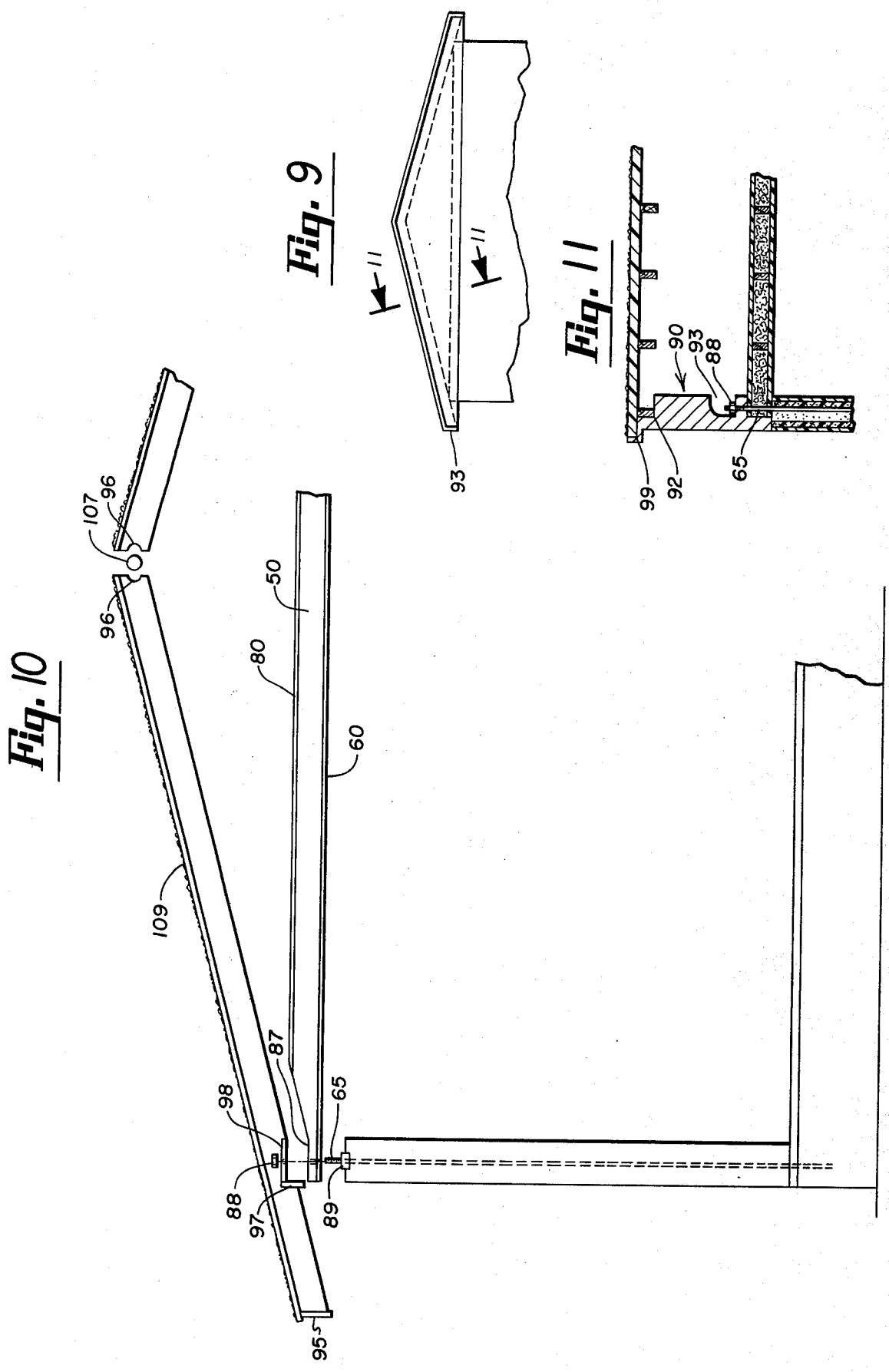

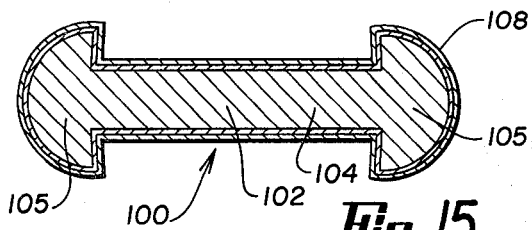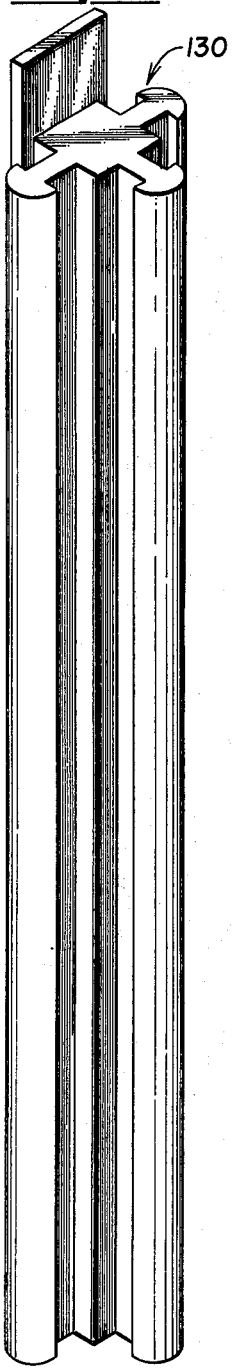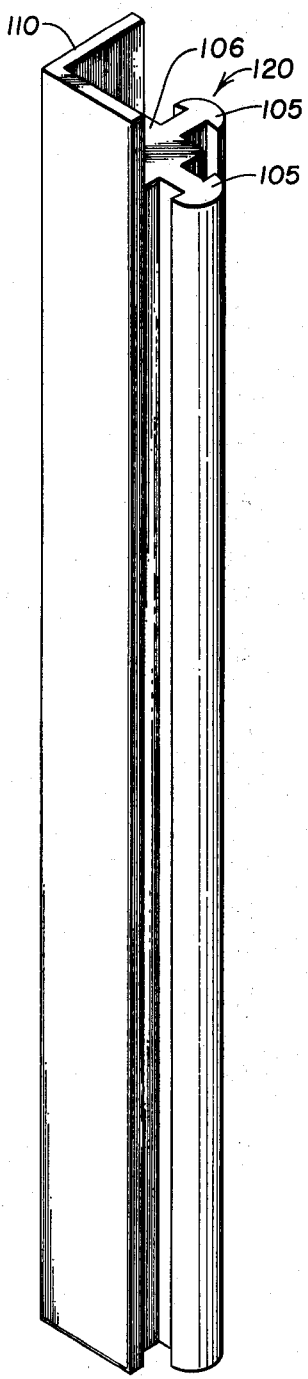

PANELS AND THE METHOD OF SAME FOR HOUSE CONSTRUCTION

This invention relates to building construction and more particularly to the method of manufacture of reinforced panels and connecting members for use in conveniently and rapidly constructing structures such as homes, buildings and in particular, small playhouses.

Reinforced panels have been used previously in building construction. Similarly, panels have been interconnected to form wall and ceiling structures as well as room dividers in building construction. In the present invention, a simplified reinforced panels is provided which may be readily massed produced to be set up on a building site in building construction. The improved panel is formed of a fiberglass and insulating material with steel rods spaced through the same to provide for the studs or bracing within the panel and with the fiberglass mats on either surface providing the interior and exterior surface of the panel. The rods extend beyond the height of the panel to enable the same to be readily interconnected by bolts to floor and ceiling joists or roof plates, and the panels include keyway members at the ends of the same to readily interconnect to adjacent panels to form exterior and interior walls of the building. The improved panels include their own insulation with excellent thermal characteristics and the keyway spline included in the panels and the key members associated therewith provide the means for interconnecting the panels and the means for compensating for diferences in temperature, frost heaves, etc. The panels may be constructed of a size to provide for entire wall or exterior surfaces to facilitate simplified construction or erection of a building on the building site.

Therefore, it is an object of this invention to provide the lightweight reinforced wall panel of sufficient size to provide for interior and exterior wall surfaces in a building construction and which panels may be readily interconnected with one another.

Another object of this invention is to provide an improved method of constructing panels.

A still further object of this invention is to provide an improved lightweight reinforced wall panel with excellent thermal insulating properties.

A still further object of this invention is to provide a wall panel which can be readily joined end to end with other similar wall panels through the use of keyway and key member connections to form a wall.

A still further object of this invention is to provide an improved key or spline for interconnecting wall panels and erecting interior walls which may be located within the panels to rigidly secure wall panels to one another.

A still further object of this invention is to provide an improved keyway member for interconnecting panels.

These and other objects of this invention will become apparent from the reading of the attached description together with the drawings wherein:

FIG. 5 is a cross sectional view of a mold of FIG. 2 taken along the lines 5—5 therein and showing the construction of the panels with the mold;

FIG. 6 is a pictorial view of a panel with parts broken awy;

FIG. 7 is a perspective view of a roof panel;

FIG. 8 is a perspective view of a roof gable;

FIG. 9 is an end elevation view of the roof gable with the roof panels installed;

FIG. 10 is a section of the elevation view of FIG. 1;

FIG. 11 is a section of the elevation view of FIG. 9 taken along the lines 11—11 therein and with parts broken away;

FIG. 12 is a perspective view of a key member used in the connection of the assembly of the panels;

FIG. 13 is a cross sectional view of the key member of FIG. 12 showing the construction of the same;

FIG. 14 is a perspective view of another form of the key member showing interconnection of three panels for exterior and interior wall construction;

FIG. 15 is a perspective view of the key member for interconnecting panels at the corner of a building;

FIG. 16 is a perspective view of the key member showing the interconnecting of exterior and interior walls.

Figure 1:
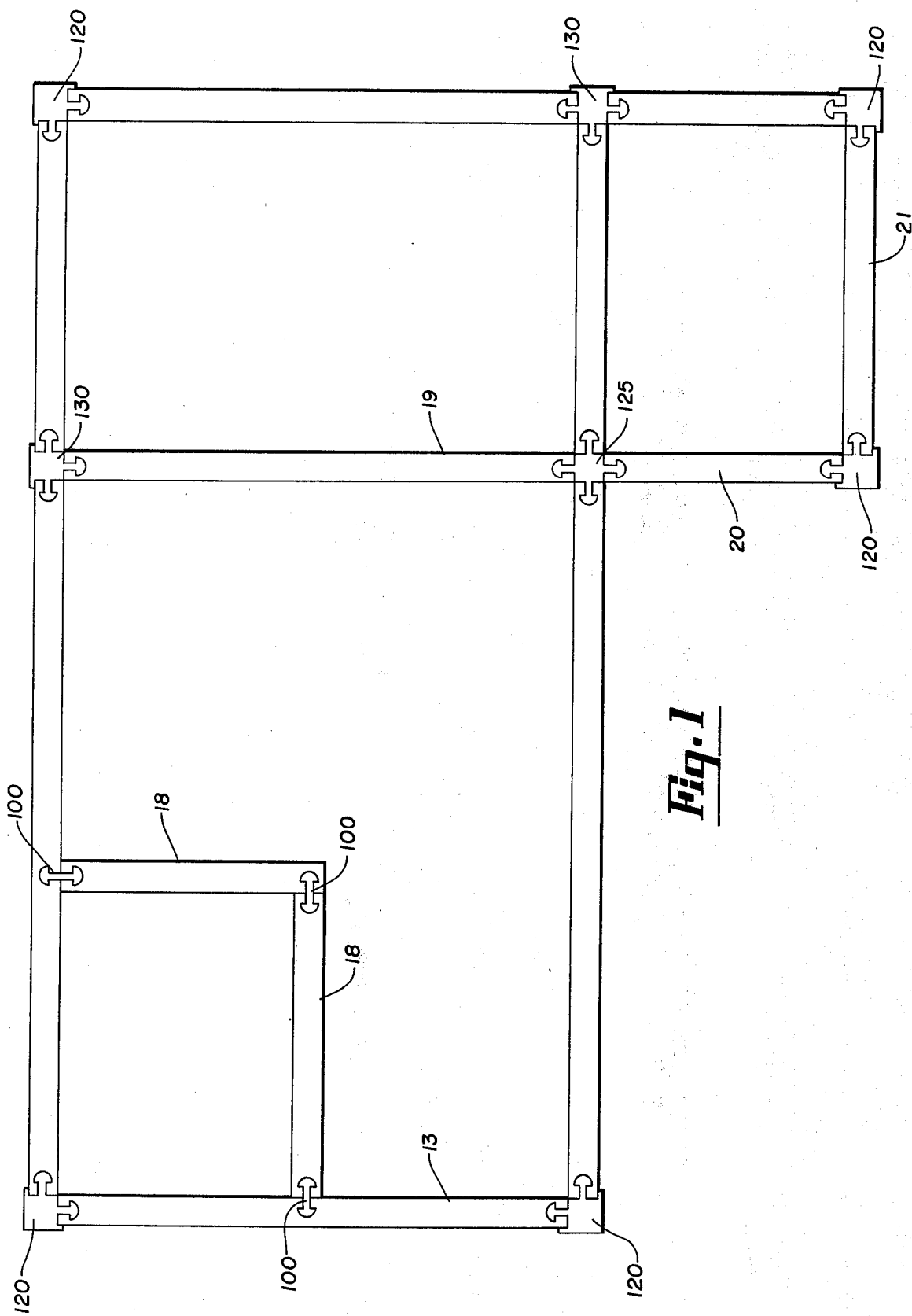
FIG. 1 is a floor plan view of a building utilizing a new method of house construction and the improved panel configuration showing the interconnection of the panels at the floor level.

In FIG. 1, I have shown a floor plan view taken through the walls of a typical building construction utilizing the improved wall panels of the present invention and the interconnecting coupling means or key members which connect the same to provide for forming of the rooms and the entire structure which is connected to a floor frame and a ceiling frame with a roof structure on top, all to be later identified. Thus, in FIG. 1, the exterior wall indicated at 12, 13, 14, and 15 are interconnected at the corners to form a generally rectangular configuration with interior petition walls 18 being connected to the exterior walls and to one another and to define another room within the enclosure. Additional wall panels 19 extends across the width of the enclosure to define still another room area and an addition to external room as indicated by the exterior wall panels 20 and 21 will define still another enclosure attached to the exterior walls in a typical type construction. The keyway and key members interconnecting will be described in detail hereinafter.

Figure 2:
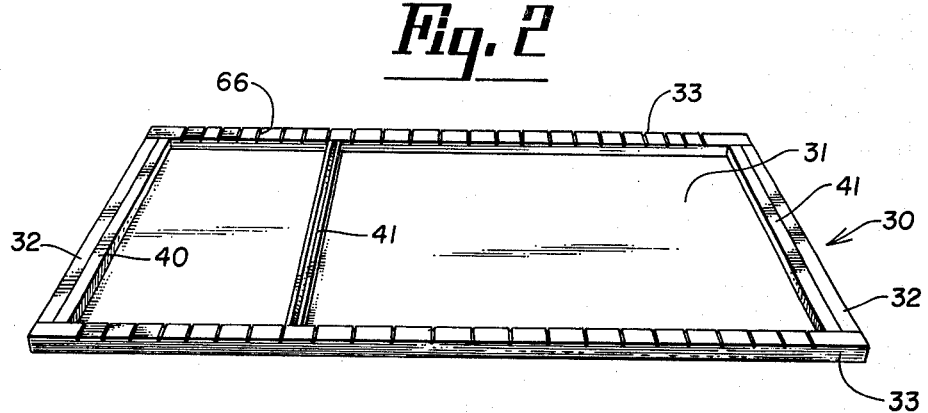
FIG. 2 is a perspective view of a mold for the formation of a wall panel.
Figure 3:
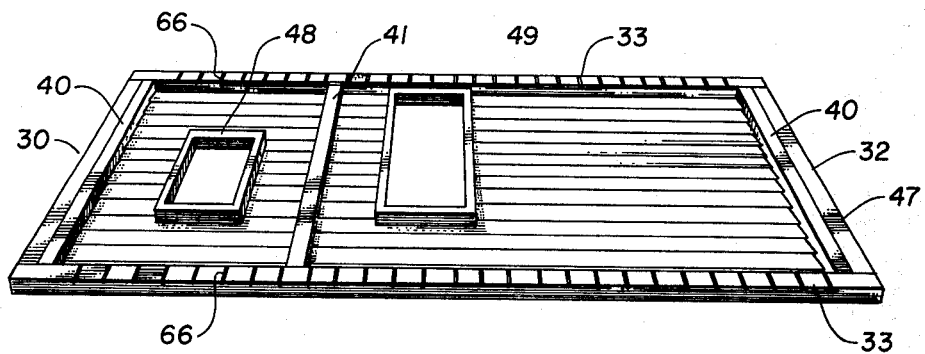
FIG. 3 is a perspective view of a mold in a modified form for exterior panel construction showing the plcement of a window and door therein.
Figure 4:
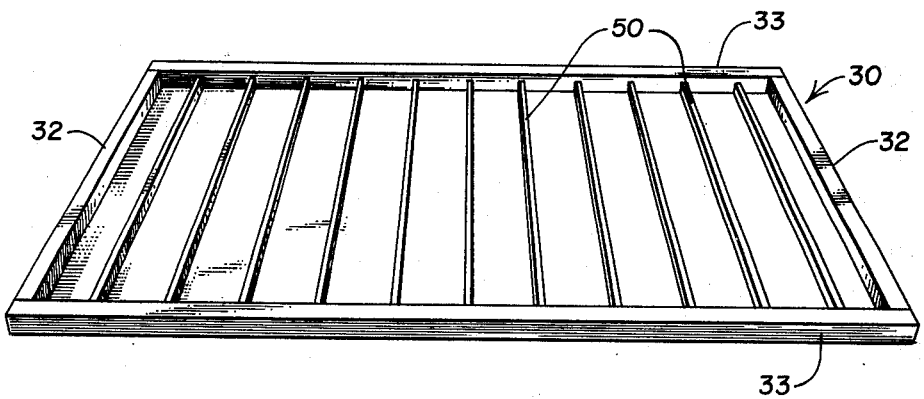
FIG. 4 is a perspective view of a mold for roof or ceiling panel construction.

FIGS. 2, 3, and 4 show variations in a mold form for the construction of panels, both exterior wall, partition wall and ceiling used in the improved building construction. Thus, in FIG. 2, a mold is shown at 30 having a solid base portion 21, fixed ends 32 secured thereto and upwardly extending sides 33 which are hinged to the base portion (not shown) and releasably interconnected with the ends 32 to define a recessed mold area in which a panel is to be constructed. Positioned in the mold form and included as part of the panel are extruded key members, indicated at 40, which are positioned at the ends of the molds and one is indicated at 41 immediate the length of the mold for purposes to be later noted. In FIG. 3, a typical exterior wall is indicated in which the mold 30 with its base structure 31 and ends 32 and upstanding sides 33 has included in addition therein window and door frames indicated at 48 and 49 respectively which frames are inserted into the mold area as are the extruded keyway members 40 and 41 and located therein to be included as part of the panel being constructed. Similarly, exterior siding material, as indicated at 47, may be included in the mold to be included as a part of the panel. Interior partitions or walls may include only the door frame member 49 in which a door will be mounted to divide rooms and provide access thereto. In FIG. 4, the mold form 30 with its upstanding sides 33 hinged to one another has positioned therein rafter or stringer member, preferably of 2 × 4' or 2 × 6' as indicated at 50, and spaced along the length of the mold and across the width of the same so that as the panel is constructed, as will be hereinafter noted, the stringers 50 or rafters will become a part of the same. The same basis mold and mold construction or panel construction may be used for both roof and ceiling panels with modification as will be seen in FIGS. 7 and 10.

FIGS. 5 shows a section of the mold of FIG. 2 with a portion of the panel construction therein and with parts broken away. Thus, in the bottom of the mold 31 there is positioned a layer of fiberglass 60 or fiberglass mat which on an interior wall will extend continuously along the bottom of the same except in areas where it is to be broken by a window or door. The mold will be of a size to effect a panel construction sufficient to extend from ceiling to floor or a mold width equal to the height of the panel and a length equal to a part or all of the wall, for example, up to approximately 20 feet for ordinary house construction. Positioned over the figerglasss mat and spaced along the extent of the same being supported by the sides 33 of the mold are a series of steel rods 65 which are positioned in slots 66 in the sides of the molds extending across the width of the same and in spaced parallel relationship and at a spacing of approximately 16 " for conventional house construction to simulate the stud spacing in a conventional wall. The rods extend beyond the edges of the mold or greater than the width of the same and extend through the slots having threaded peripheral surfaces at the end of the same. With the rods in place over the lower fiberglass mat, layer 66 of acrylic material such as Resonate, is positioned over the entire exposed surface of the fiberglass mat. In the areas of the rods, a filler is added to the acrylic such that there is a buildup of material 68 in the area of the rods. Next is positioned in the mold a series of plastic container members 70 filled with a plastic or foam polystyrene chips 71 as insulating material the thickness of the container is substantially equal to the depth of the panel except for the mats on either side of the same. The plastic containers are of a width dimension sufficient to extend substantially between the pair of rods 65 in the molds and extend from one side to the other. The acrylic material 66 and the containers 70 are applied to sequence with the acrylic material being allowed to become tacky before the containers 70 are added such that the container with insulating material 71 would adhere to the lower fiberglass mat. The spacing between each container in which the rod is positioned is then filled with an acrylic binder, such as pumice, to form a solid mass of material 68 which when hardened around the rod and adhering to the lower mat will form a stud-like structure extending across the entire width or the height of the panel when it is removed from the mold. An additional acrylic layer 73 is then applied across the containers. As the mold was set up, a suitable extruded keyway member made of a plastic material and extending the full width of the mold at either end of the same and as indicated at 40 or 41 are positioned in the mold with a slot 72 therein facing outwardly. As will be hereinafter noted, the keyway members will provide the means for connecting the finished panel to one another to the construction of the house. Where an interior or exterior partition is to be added, an additional keyway member, such as is indicated at 41, will be positioned in the mold above the fiberglass mat 60 if the partition is to extend from the upper surface of the panel, or the keyway member may be reversed and the slot 72 therein will be facing downwardly toward the bottom of the mold 32 in which case the fiberglass mat 60 will abute the same so as not to cover the slot therein. With the mat 60 and the keyway members 40 and 41, positioned within the initial mold and the container 70 of the insulating material 71 added thereto together with the acrylic and binder 68 surrounding the steel rod therein, an upper layer of fiberglass material 80 is added to the mold after an additional surfacing 73 of acrylic material is positioned on the exposed surface of the containers. The upper fiberglass mat 80 will adhere to the containers 69 and the keyway members 70, 75, and define the opposite or top surface of the panel member in the mold. The acrylic material will saturate the fiberglass mat 80 to adhere to the insulating material and the areas of the rods so that a composite panel will be constructed in which an upper and lower or inner and outer layer 60, 80 of fiberglass will be exposed in the completed panel which will be separated by containers 70 positioned therebetween and with insulating material therein together with a series of spaced steel rods 65 surrounding by an acrylic filler 68 which will provide the stud structure within the panel for strength of the same. The keyway members positioned in the panel at the ends of the same or intermediate the extent of the same will provide the means for connecting the panels to one another and will facilitate ready and simplified assembly of the panels through the use of key members to be later described.

Where an outside wall or an interior wall is to have an opening therein such as a window or door opening, wondow and door frames will be positioned in the mold, such as is indicated in FIG. 3, which frames will have a depth dimension equal to the desired depth or thickness of the panel such that the frame will project to either side thereof. Similarly, where keyway members, such as keyway 41 is to be positioned facing the bottom of the mold, it will be inserted along with the frame members or in the same manner as the frame members before the initial fiberglass layer 60 is positioned in the mold. Were such a keyway member is to be positioned facing upwardly toward the top of the mold and exposed through the upper surface of the resulting panel, the keyway member 41 will be added to the mold above the lower fiberglass mat, at the same time the rods are positioned therein.

Where the mold construction is to be for a ceiling or roof panel, the lower fiberglass mat is positioned in the mold such as is indicated in FIG. 4 and then the stringers or rafters 50 are added above the layer such that the acrylic material will cause the same to adhere to the lower layer and form a part of the panel. The ceiling and roof panel construction differ from the wall panels which utilize the steel rods with the acrylic material surrounding the same in that they use the rafter with the parallel spacing of approximately 16" within the panel. The overall ceiling and roof panel will thus be former of an inner and outer layer of fiberglass material with reinforcing wooden stringers distributed along the extent of the same and between the container of insulat- ing material. The upper surface of the panel has a flange surface formed in one edge of the same, as at 85, and a recessed surface 86 at the other side edge. These are formed by inserting removable block members in the mold at the time of construction. The opposite edges of the ceiling panels have recessed surfaces 87 therein, see FIGS. 7 and 10, to facilitate mounting of ceiling roof panels on the wall panels as will be hereinafter identified. The ceiling panels have insulation between the rafters and the roof panels are contructed without insulation between the rafters. The roof panels are constructed in the same type of mold form as the ceiling panels, except that an initial layer of roofing material, such as pea rock 109, is placed on the bottom of the mold before the first layer of fiberglass mat is installed such that the acrylic material when applied to the surface of the fiberglass mat on either side thereof, will cause the rock to adhere to the lower mat which becomes the exposed roof surface. The stringers or rafters are added above the lower mat with each stringer being notched, as at 94, as will be best seen in FIG. 10. The ends of the stringers are cut at an angle to the longitudinal extent to provide vertical surfaces when the panels are installed on the gable ends with a plate member 95 positioned at the eave end of the rafters and secured thereto and with a semicircular groove 96 positioned in the opposite ends of each stringer or the hip end of the panel. No insulation is added between the rafters of the roof panel and the upper fiberglass mat with the acrylic is positioned from the eave end up to the notch 94 forming the undersurface of the eave to complete the panel. When installed, the roof panel has a pair of plate members secured to the rafters, as indicated at 97, 98, the plate member 97 acting as a weather strip to abute the end of the ceiling panel and provide an exposed surface at the inner edge of the eave. The plate 98 is secured to the notch which bears on the recess 87 in the ceiling panel a series of apertures through the plate 98 will provide for extension of the rods 65 from the wall panel through similar apertures in the ends of the ceiling panels and through the plate to permit the positioning of a nut 88 on the end of the same securing the roof and ceiling panels to the wall panels. A circular dowl rod 107 is positioned in the semicircular notches of each of the panels at the hip ends where they join and are secured to the roof panels to prevent movement of the hip ends of the roof panels where they abute one another. The opposite edges of the roof panels, like the ceiling panels, have overlap portions defined by the recesses 86 and the flange 85 where they abute in the adjoining panels. At the exposed ends of the roof panel, the panels are formed with notches 93 which fit into the gable members as will be seen in FIG. 11. Keyway members are omitted in the roof and ceiling panels since they are not joined by keyway members and the roof and ceiling panels, as heretofore noted, are secured in assembled relationship on the wall panels by the means of the threaded ends of the rods 65 passing therethrough and through the plate 98 to permit location of a nut 88 on the ends of the same to clamp the roof and ceiling panels on the to the prop of the wall panels. A suitable rubber seal may be positioned around the rod, as indicated at 89, to provide for weather stripping at this joint between the panels, as seen in FIG. 10.

The improved panel construction is lightweight, durable and presents good thermal insulating characteristics. Where an exterior panel is to be used, the exterior facing may be applied after the panel construction or may be included in the molding process as a first step below the upper or lower fiberglass mats. The fiberglass mats may form the surface for the interior wall formed by the panels if desired. Thus, as shown in FIG. 5, a completed wall panel provides the upper end lower fiberglass mats with the Resonate and rods 65 to form studs between the same and separated by the polystyrene insulation positioned in plastic canisters 70. The roof and ceiling panels, as heretofore noted, utilizes the wooden stringers in place of the rods and Resonate for the studs, and the roof panels eliminate the insulation but the same type of construction is applied throughout the building.

In the construction of a building, in addition to the wall and ceiling panels, the normal floor panel or floor construction provides a surface to which the standing wall panels are attached. The projection of the rods 65 beyond the ends of the panel permit the panels to extend through holes in the floor still and the connection of a nut 80 on the threaded ends of the same to secure the same to the floor. Similarly, the extension of the rods to the upper end of the same will extend through the ceiling panels to be secured to the same manner as shown in FIG. 10 to the roof panels. As the panels are removed from the molds, the hinged sides 33 are dropped permitting the panel to be lifted out of or away from the base form. The molded roof panels in addition to the ceiling panels utilize the stringers or rafter members 50 embedded in the panel and the upper fiberglass mat or exposed upper mat are offset in the top panel as indicated by the flange 85 and recess 86 in FIG. 7 to provide an overlapping of the panels. The roof panels and the ceiling panels in addition have special notched construction or recessed construction to enable the roof panel to rest against the ceiling panel on a wall panel along the eave edge of the building. The roof panels have a notched surface intermediate the extent to define the eaves with a fiberglass covering inserted on the under surface of the eaves and with plates 97, 98 to provide for a seal and an anchoring point to secure the roof panels at the eave edge to the ceiling panel and the wall panel. At the gable ends of the building construction, the wall panels support the gable members which in turn support the gable ends of the roof panels. Thus along with the wall panels, the gable members 90 support the roof panels at this end and provide the pitch of the roof. The gable members are also in the molded construction such as is indicated in FIG. 8. They may be molded with a similar sandwich type construction of fiberglass mats with suitable stringers (not shown) and a recessed portion 92 exposed at the top edge of the same to provide for a surface for supporting the ends of the roof panels at the gable ends of the house. The roof gable members 90 are generally triangular in shape with the recessed portion on the top surface and they will extend across the top of the ceiling and be connected thereto and to the wall panels at the edge and beneath the same through suitable means. As shown in FIG. 11, notch 99 extending across the inner surface of the gable members permits access to the ends of the threaded rods from the wall panel members beneath the ceiling member such that the threaded ends of the rods 65 in the wall panel will extend through this edge of the ceiling panel and through the portion of the gable member to the recessed surface 94 such that a nut may be secured to the threaded end to mount the gable members on the wall panels at this end of the house to secure this edge of the ceiling panels therebetween. Thus, the gable members are secured to the wall members and secure this edge of the ceiling panels therebetween and provide the support for the roof panels which rest in the notch or shoulder 92 thereof.

The key members which fit into the keyway member 40, 41, within the panel are shown in cross section of FIG. 1 in a variety of forms and in FIGS. 12, 13, 14, 15, and 16 of the drawings. These keyway members are all similarly constructed on a wooden form having a screen mesh positioned around the surface of the same and an acrylic covering. They are constructed of a length to correspond with the height of the walls or the length of the keyway members 40, 41, positioned in the mold. Thus, in FIGS. 12 and 13, a partition keyway member is indicated at 100, the keyway member having a wooden core 102 with a section 104 terminating in the key shaped heads or mushroom shaped head 105 of the same configuration as the grooves 72 in the keyway members. The heads have a slight inwardly directed bevel at 107, to cause the keyway members to fit into the spline opening and pull the panel together. A similar construction is used in the keyway member 120, 125, 130 to be hereinafter identified. The splines and keyway members fit together to compensate for expansion and contraction due to weather conditions. A screen mesh 107 surrounds the core 102 and an acrylic covering 108 is positioned over the mesh to strengthen the keyway member. A corner keyway member 120 has a fiberglass mat surface 110 positioned on two sides of a square wooden core 106 as shown in FIG. 14 opposite which the key portions 105 extend. Steel mesh 108 is positioned over the core sections 104 and heads 105 and to the mat surfaces 110. An acrylic covering or plastic covering is positioned over the same such as indicated at 108 in FIG. 13 to cause the mesh to adhere to the wooden form and to secure the fiberglass to the opposite edge of the same. The corner key members, as will be seen in FIG. 1, connect the outside panels together at right angles to one another to secure the panels in assembled relationship with the panels being secured to the roof and ceiling through threaded connections of the rod and bolt securing the same to the floor and ceiling. Intermediate key members of slightly different configurations are shown in FIG. 1 at 125 and in FIG. 16 for connecting partitions, or as a four way key to connect two interior walls with two exterior wall sections. Similarly, in FIG. 15 a three surfaced spline 13 is shown which is used for connecting an addition to the exterior walls or in place of the corner spline to connect an additional external wall for a room enclosure projecting from the main enclosure. The same basic construction is utilized with the wood form having the layer of screen mesh positioned over the same and the acrylic covering. The partition splines 100 have no exposed surface outside of the panel and the connecting portion between the key head portions is of a length sufficient to position the head portions 105 in the respective slots of the panel members. The corner key members 170 and the three way 130 and four way 125 key members all have a base or core portion 106 with the interconnecting head portions, the base body portion being of a general dimension similar to the thickness of the wall panel.

In the installation of the key members, the panels are positioned in abutting or near abutting relationship and the key member is positioned with the head portions into the recessed surface of the extruded keyways and the key members are then forced down drawing the panels together and holding the panels together while providing a seal and joint between the panels to secure the same. Thus, the improved panel construction provides for a sandwich type layer of inner and outer surface of fiberglass material with an insulating layer in between, defining the thickness of the panel and with stud members formed by the acrylic material positioned between the insulating canisters and surrounding the steel rods which provide the strength and rigidity of the stud members. The extensions of the same beyond the ends of the panel permit connection of panels to the ceiling and floor panels and the key members fitting into the keyways located in the panels secure the panels together in assembled relationship. The complete assembly provides for a simplified, readily assembled type building construction which is rigid yet lightweight and durable and to which exterior and interior surfaces for the panels may be easily attached or may be molded into the panels at the time of construction of the same.

Therefore, it is intended that the present disclosure be illustrative of the type of building panel construction and method of making the same and the scope of the invention should be determined by the appended claims.

What I claim is:

1. The method of constructing panels for house construction comprising, placing a surface layer of fiberglass material in the bottom of a mold of dimensions for the desired panel and covering the bottom of the same; inserting metal rods across the mold in spaced parallel relationship and extending beyond the edges of the mold; applying a layer of acrylic material over the material and around the rods; positioning of insulation material in a plastic covering in spaced rows between the rods and extending across the mold; adding acrylic material with a filler around the rods and in the spacing between the insulation material to the depth of the insulation material and in contact with the lower fiberglass layer; applying a fiberglass mat over the top of the mold and in contact with the acrylic and filler material to saturate the same therewith; and allowing the layer of fiberglass material and mat with the insulation and rods between to harden and removing the completed panel from the mold.

2. The method of constructing panels for house construction of claim 1 and including the placing of keyway strips at the ends of the molds parallel to the rods and the insulating matting and covering the same with acrylic and filler material to secure the same to the panels.

3. The method for constructing panels for house construction of claim 2 and including the adding of keyway strips intermediate the extent of the panel and facing the upper surface of the same with the acrylic material securing the keyway strips to the panel.

4. The method of constructing panels for house construction of claim 2 which includes inserting blanking frame members of a thickness and size into the mold to extend from top to bottom of same prior to laying of the initial fiberglass layer and the positioning of rods and insulation therein to provide for opening in the panels when completed.

5. The method of constructing panels for house construction of claim 4 and including adding a facing material to at least one side of the finished panel.

6. The method of constructing panels for house construction of claim 5 in which the rods are spaced a distance of approximately 16 inches apart.

7. The method of constructing panels of house construction of claim 6 and including the securing of the insulation packages to one another prior to the adding of the acrylic and filler and the positioning of the top layer of fiberglass mats.

8. The prefabricated panel including, an outer layer of fiberglass mat having a suitable facing material secured thereto; an inner core of insulating material extending in spaced rows across the width of the panel, a metal rod positioned in the space between each row of insulating material and secured to the insulating material and the outer layer of fiberglass mat by acrylic and filler material; and a top layer of fiberglass material secured to the insulating material and bonded thereto by an acrylic material.

9. The prefabricated panel of claim 8 in which the insulation material is confided in plastic sleeves filled with a polystyrene.

10. The prefabricated panel of claim 8 in which the rods extend parallel to one another and beyond the edges of the panel.

11. The prefabricated panel of claim 10 in which the rows of insulating material are secured to one another.

12. The prefabricated panel of claim 8 and including keyway members having outwardly facing slots positioned in each end of the panel and extending parallel to the rows of insulating material and through the extent of such end.

13. The prefabricated panel of claim 12 and in which the keyway members are made of an extruded plastic material and bonded to the panel with the acrylic material contacting the insulating material and the outer and inner fiberglass mats.

14. The prefabricated panel of claim 13 including an additional keyway member positioned intermediate the ends of the panel with the slot therein facing outwardly through one of the fiberglass mats of the panel.

15. The prefabricated panel of claim 14 and including a key member positioned in slots of one of said keyway members, said key member being formed of a wooden base having key surfaces extending along the extent of the same configuration as the slot or at least two ends of the key member with a connecting portion connecting the key surfaces; a wire mesh positioned over the wooden base, and a fiberglass mat covered with acrylic material thereon positioned over the wire mesh.

* * * * *

UNITED STATES PATENT OFFICE
CERTIFICATE OF CORRECTION

PATENT NO. : 4,004,387
DATED : January 25, 1977
INVENTOR(S) : Jerome B. Ellingson It is certified that error appears in the above-identified patent and that said Letters Patent are hereby corrected as shown below:

Column 2, line 7, delete "awy" and insert - away -

Signed and Sealed this

Fifth Day of April 1977

[SEAL]

Attest:

RUTH C. MASON
Attesting Officer

C. MARSHALL DANN
Commissioner of Patents and Trademarks